United States Patent
Zhang

(10) Patent No.: US 11,149,612 B2
(45) Date of Patent: Oct. 19, 2021

(54) METHOD FOR OPERATING AN EXHAUST GAS POST TREATMENT SYSTEM OF A DIESEL ENGINE AND EXHAUST GAS POST TREATMENT SYSTEM

(71) Applicant: Vitesco Technologies GMBH, Hannover (DE)

(72) Inventor: Hong Zhang, Tegernheim (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/840,429

(22) Filed: Apr. 5, 2020

(65) Prior Publication Data
US 2020/0232363 A1    Jul. 23, 2020

Related U.S. Application Data

(63) Continuation of application No. PCT/EP2018/077097, filed on Oct. 5, 2018.

(30) Foreign Application Priority Data

Oct. 5, 2017 (DE) .................. 10 2017 217 728.4

(51) Int. Cl.
| | |
|---|---|
| *F01N 3/20* | (2006.01) |
| *F01N 9/00* | (2006.01) |
| *F01N 13/00* | (2010.01) |
| *F01N 3/10* | (2006.01) |
| *F01N 11/00* | (2006.01) |

(52) U.S. Cl.
CPC .............. *F01N 3/208* (2013.01); *F01N 9/00* (2013.01); *B01D 2258/012* (2013.01);
(Continued)

(58) Field of Classification Search
CPC .... F01N 11/00; F01N 13/009; F01N 13/0097; F01N 2560/026; F01N 2560/14;
(Continued)

(56) References Cited

U.S. PATENT DOCUMENTS 9,714,625 B2 * 7/2017 Sun .................. F02D 41/146
2011/0138779 A1 6/2011 Neumayer
(Continued)

FOREIGN PATENT DOCUMENTS

| DE | 102014201304 A1 | 7/2015 |
|---|---|---|
| DE | 102014213890 A1 | 1/2016 |

(Continued)

OTHER PUBLICATIONS

International Search Report and Written Opinion dated Nov. 28, 2018 from corresponding International Patent Application No. PCT/EP2018/077097.

(Continued)

*Primary Examiner* — Anthony Ayala Delgado

(57) ABSTRACT

A method for operating an exhaust gas post-treatment system of a diesel engine and associated exhaust gas post-treatment system are described. The system has two NOx sensors upstream and downstream of an SCR catalytic converter. The NOx sensor downstream of the SCR catalytic converter is used to divide the NOx information measured by the sensor upstream of the SCR catalytic converter into an NOx value and an $NH_3$ value. Using this simple method, the SCR catalyst control and diagnosis can be carried out precisely and robustly.

10 Claims, 2 Drawing Sheets

(52) U.S. Cl.
CPC ............... *F01N 3/103* (2013.01); *F01N 11/00* (2013.01); *F01N 13/009* (2014.06); *F01N 2560/026* (2013.01); *F01N 2560/14* (2013.01); *F01N 2610/02* (2013.01); *F01N 2900/1621* (2013.01)

(58) Field of Classification Search
CPC ......... F01N 2610/02; F01N 2900/0412; F01N 2900/1621; F01N 3/021; F01N 3/035; F01N 3/0807; F01N 3/103; F01N 3/2066; F01N 3/208; F01N 9/00
See application file for complete search history.

(56) References Cited

U.S. PATENT DOCUMENTS

| | | | |
|---|---|---|---|
| 2014/0311428 A1* | 10/2014 | Miyagawa | F01N 3/2066 123/3 |
| 2015/0143801 A1* | 5/2015 | Asaura | F01N 3/208 60/286 |
| 2016/0121266 A1* | 5/2016 | Nagoshi | B01D 53/9477 423/239.1 |
| 2016/0279574 A1* | 9/2016 | Devarakonda | F01N 3/2066 |
| 2017/0051654 A1* | 2/2017 | Gupta | F01N 3/035 |
| 2017/0130628 A1* | 5/2017 | Franz | F01N 3/2882 |
| 2017/0218828 A1 | 8/2017 | Schweizer | |
| 2019/0383192 A1* | 12/2019 | Dou | F01N 13/0093 |

FOREIGN PATENT DOCUMENTS

| | | |
|---|---|---|
| DE | 102016201602 A1 | 8/2017 |
| EP | 2899379 A1 | 7/2015 |

OTHER PUBLICATIONS

Chinese Office Action dated Jul. 15, 2021 for corresponding Chinese Patent Application No. 201880064936.7.

* cited by examiner

METHOD FOR OPERATING AN EXHAUST GAS POST TREATMENT SYSTEM OF A DIESEL ENGINE AND EXHAUST GAS POST TREATMENT SYSTEM

CROSS-REFERENCE TO RELATED APPLICATIONS

This application claims the benefit of PCT Application PCT/EP2018/077097, filed Oct. 5, 2018, which claims priority to German Application DE 10 2017 217 728.4, filed Oct. 5, 2017. The disclosures of the above applications are incorporated herein by reference.

TECHNICAL FIELD

The disclosure relates to a method for operating an exhaust gas post-treatment system of a diesel engine, which has an SCR combined diesel particle filter in the exhaust gas line and an SCR catalyst downstream thereof in the exhaust gas line. A watery urea solution is injected into the exhaust gas line upstream of the SCR combined diesel particle filter.

BACKGROUND

It is generally known that the limit values for emissions from diesel engines are being ever lowered, where this concerns not only the corresponding values on the test bench but also those in real driving cycles. It is therefore of great importance to obtain as much information as possible in order to be able to perform careful diagnosis and control of the exhaust gas post-treatment system.

In the exhaust gas post-treatment systems of diesel engines, previously a diesel oxidation catalyst (DOC) was provided with a diesel particle filter downstream thereof in the exhaust gas line. A watery urea solution was injected into the exhaust gas line downstream of this diesel particle filter. An SCR catalyst (selective catalytic reduction catalyst) was arranged downstream of the corresponding injection point to reduce the NOx (Nitrogen Oxide) proportion in the exhaust gas. Two NOx sensors were arranged upstream of the diesel oxidation catalyst and downstream of the SCR catalyst, where the NOx sensor downstream of the SCR catalyst was used to adapt the loading model of $NH_3$ in the SCR catalyst to ensure that the actual SCR load corresponded to the respective nominal value.

More recently however, two SCR catalysts have been used in such an exhaust gas post-treatment system. One such SCR catalyst is here combined with a corresponding diesel particle filter and, for example, has a corresponding SCR coating. Such an SCR combined diesel particle filter (SCRF) therefore fulfils both objectives: selective catalytic reduction and particle filtration.

With such an arrangement, a second SCR catalyst is arranged in the exhaust gas line downstream of such an SCR combined diesel particle filter. The watery urea solution is injected upstream of the SCR combined diesel particle filter.

SUMMARY

The present disclosure provides an exhaust gas post-treatment system which has a combination of an SCR combined diesel particle filter (SDPF) and a downstream SCR catalyst. According to the disclosure, corresponding information is obtained relating to such a combined system, in order to be able to diagnose and control the system in a particularly precise and robust fashion. A method of the type described allows for a particularly precise emissions post-treatment.

The method includes measuring the NOx concentration downstream of the SCR catalyst by an NOx sensor. The method also includes measuring the NOx concentration upstream of the SCR catalyst by an NOx sensor. The method includes identifying the NOx concentration measured upstream of the SCR catalyst as $NH_3$ if the ratio between the NOx concentration measured downstream of the SCR catalyst and the NOx concentration measured upstream of the SCR catalyst is greater than a first threshold value, and the difference between the NOx concentration measured upstream of the SCR catalyst and the NOx concentration measured downstream of the SCR catalyst is greater than a second threshold value. The method also includes reducing the injected watery urea solution until the above-mentioned conditions are no longer fulfilled. In other words, reducing the injected watery urea solution when the ratio between the NOx concentration measured downstream of the SCR catalyst and the NOx concentration measured upstream of the SCR catalyst is less than or equal to a first threshold value, and the difference between the NOx concentration measured upstream of the SCR catalyst and the NOx concentration measured downstream of the SCR catalyst is less than or equal to a second threshold value.

Implementations of the disclosure may include one or more of the following optional features. In some implementations, the NOx sensor downstream of the SCR catalyst is used to divide the NOx information measured by the NOx sensor upstream of the SCR catalyst into an NOx value and an $NH_3$ value. In this way, information is obtained on the $NH_3$ proportion in the exhaust gas upstream of the SCR catalyst, which is used with respect to the injected watery urea solution, where the supply of the latter is reduced until the conditions imposed according to the disclosure are no longer fulfilled (i.e., the ratio between the NOx concentration measured downstream of the SCR catalyst and the NOx concentration measured upstream of the SCR catalyst is less than or equal to a first threshold value, and the difference between the NOx concentration measured upstream of the SCR catalyst and the NOx concentration measured downstream of the SCR catalyst is less than or equal to a second threshold value). Therefore a method is provided for separating the corresponding $NOx/NH_3$ information from the measured NOx sensor signals, which may be implemented in simple fashion and allows precise and robust control and diagnosis of the exhaust gas post-treatment system including the SCR combined diesel particle filter and SCR catalyst.

The first threshold value may, for example, amount to 1, and the second threshold value may, for example, amount to 40 ppm. The $NH_3$ concentration downstream of the SCR catalyst ($NH_3\_a\_SCR$) may be calculated from the NOx concentration $NOx\_a\_SCR\_Sensor$ measured by the NOx sensor downstream of the SCR catalyst, using the following formula:

$$NH_3\_a\_SCR = NOx\_a\_SCR\_Sensor / Factor\_NH_3$$

$Factor\_NH_3$ is a sensitivity factor of the $NH_3$ measurement by the NOx sensor in comparison with the NOx measurement. It amounts for example to 1.1, since $NH_3$ has a higher diffusion constant and therefore a higher value in comparison with the NOx value.

If the above-mentioned conditions (ratio between the measured NOx concentrations and difference between the measured NOx concentrations) are not fulfilled, preferably the NOx concentration measured by the NOx sensor downstream of the SCR catalyst is equated to the NOx concentration measured by the NOx sensor upstream of the SCR catalyst, and from this the $NH_3$ concentration upstream of the SCR catalyst is determined. The $NH_3$ concentration upstream of the SCR catalyst can therefore be determined as follows:

NOx_b_SCR=NOx_a_SCR_Sensor

NH_3_b_SCR=(NOx_b_SCR_Sensor−NOx_b_SCR)/Factor_NH_3 where:
NOx_b_SCR=NOx concentration determined upstream of the SCR catalyst;
NH_3_b_SCR=$NH_3$ concentration determined upstream of the SCR catalyst;
NOx_b_SCR_Sensor=NOx concentration measured by means of the NOx sensor upstream of the SCR catalyst;
NOx_a_SCR_Sensor=NOx concentration measured by means of the NOx sensor downstream of the SCR catalyst;
Factor_NH_3=sensitivity factor of $NH_3$ measurement by the NOx sensor in comparison with the NOx measurement (for example 1.1, since $NH_3$ has a higher diffusion constant and therefore a higher measurement value in comparison with the NOx signal).

The information, determined in the above-mentioned fashion, on the NOx and $NH_3$ concentrations upstream and downstream of the SCR catalyst may then be compared with the NOx and $NH_3$ model values upstream and downstream of the SCR catalyst calculated by an SCRF and SCR load model, and these model values may be adapted accordingly if the deviation is greater than a threshold value, in order to adapt the model values to the values obtained from the NOx sensor information.

Furthermore, an SCRF/SCR efficiency diagnosis may be performed if the actual SCRF and SCR load lies close to the nominal load. Here for example, an OBD (on-board diagnosis) threshold value may be applied depending on the load. In this way, the OBD diagnosis can be made robustly.

In some examples, furthermore a third NOx sensor is arranged upstream of the SCR combined diesel particle filter (SDPF).

Another aspect of the disclosure provides an exhaust gas post-treatment system of a diesel engine which has an SCR combined diesel particle filter in the exhaust gas line, and an SCR catalyst in the exhaust gas line downstream thereof. A watery urea solution is injected into the exhaust gas line upstream of the SCR combined diesel particle filter. The exhaust gas post-treatment system has a first NOx sensor in the exhaust gas line upstream of the SCR catalyst and a second NOx sensor in the exhaust gas line downstream of the SCR catalyst. With this combination of NOx sensors, the method described above can be carried out.

In some examples, the exhaust gas post-treatment system has a device for supplying a watery urea solution into the exhaust gas line only upstream of the SCR combined diesel particle filter.

In some examples, a third NOx sensor is provided in the exhaust gas line upstream of the SCR combined diesel particle filter. Furthermore, with this system a diesel oxidation catalyst (DOC) may be arranged in the exhaust gas line upstream of the SCR combined diesel particle filter.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
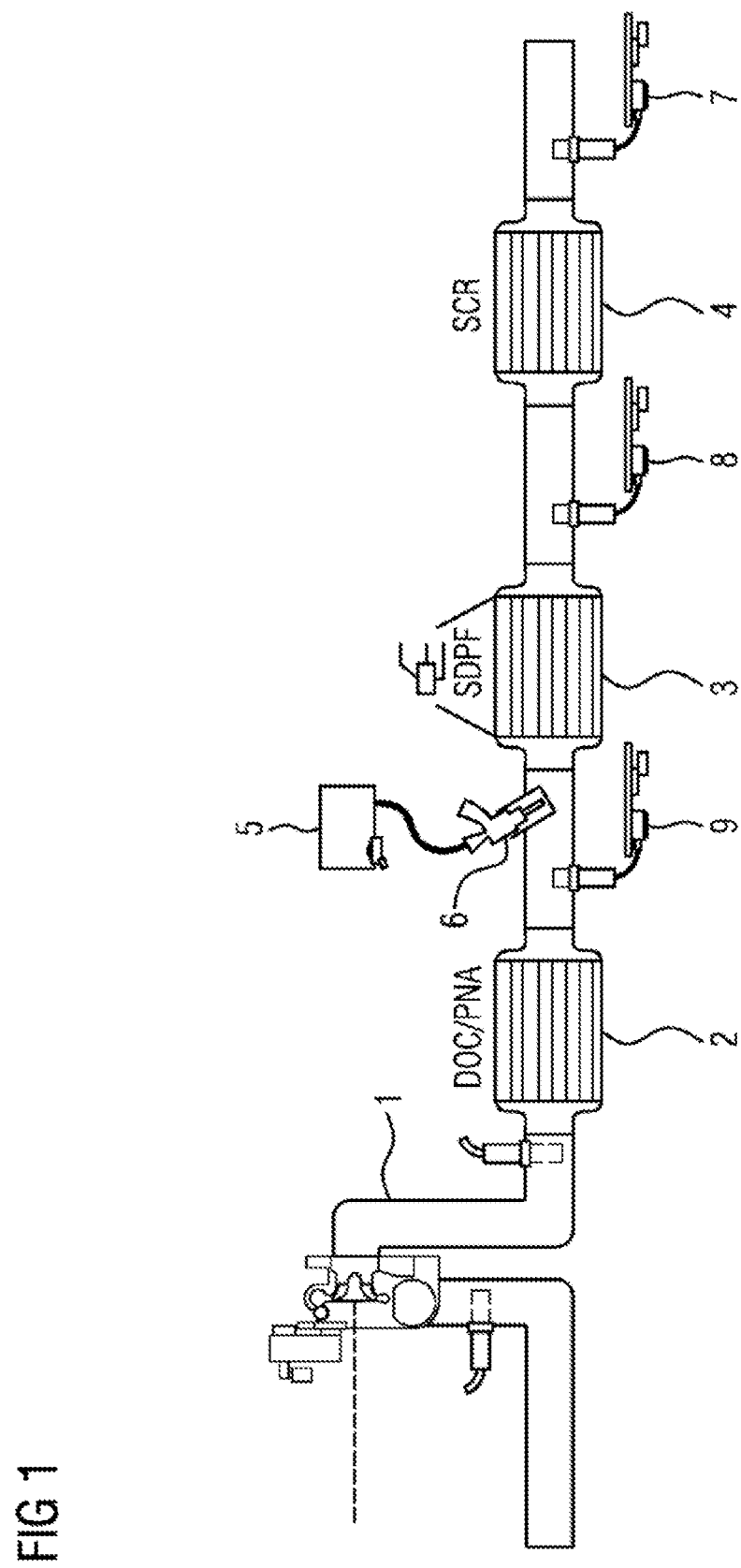
FIG. 1 is a schematic illustration of an exhaust gas post-treatment system.

The exhaust gas post-treatment system of a diesel engine, depicted diagrammatically in FIG. 1, has an exhaust gas line 1 through which exhaust gas from the engine flows from left to right in the figure. Next to the engine, a diesel oxidation catalyst 2 is provided in the exhaust gas line, followed downstream by an SCR combined diesel particle filter 3. An injection point 6 for a watery urea solution, which is provided in a suitable tank 5, is situated between the diesel oxidation catalyst 2 and the SCR combined diesel particle filter 3. An SCR catalyst 4 is provided downstream of the SCR combined diesel particle filter 3. The corresponding catalysts and particle filters are generally known, so details thereof need not be described further at this point. Also, the corresponding functions of these components were explained initially.

A respective NOx sensor 8, 7 is arranged in the exhaust gas line upstream and downstream of the SCR catalyst 4. A further optional NOx sensor 9 is arranged in the exhaust gas line upstream of the SCR combined diesel particle filter 3.

As explained initially, various NOx concentration values in the exhaust gas are determined by the arrangement of the two NOx sensors 8, 7 upstream and downstream of the SCR catalyst 4. For example, the NOx sensor downstream of the SCR catalyst is used to divide the NOx information measured upstream of the SCR catalyst into an NOx value and an $NH_3$ value. Then the metered supply of the watery urea solution is controlled for example according to the results.

Overall, the NOx and $NH_3$ concentrations upstream and downstream of the SCR catalyst are determined and compared with corresponding load models, where adaptation is performed if the deviations are great.

Figure 2:
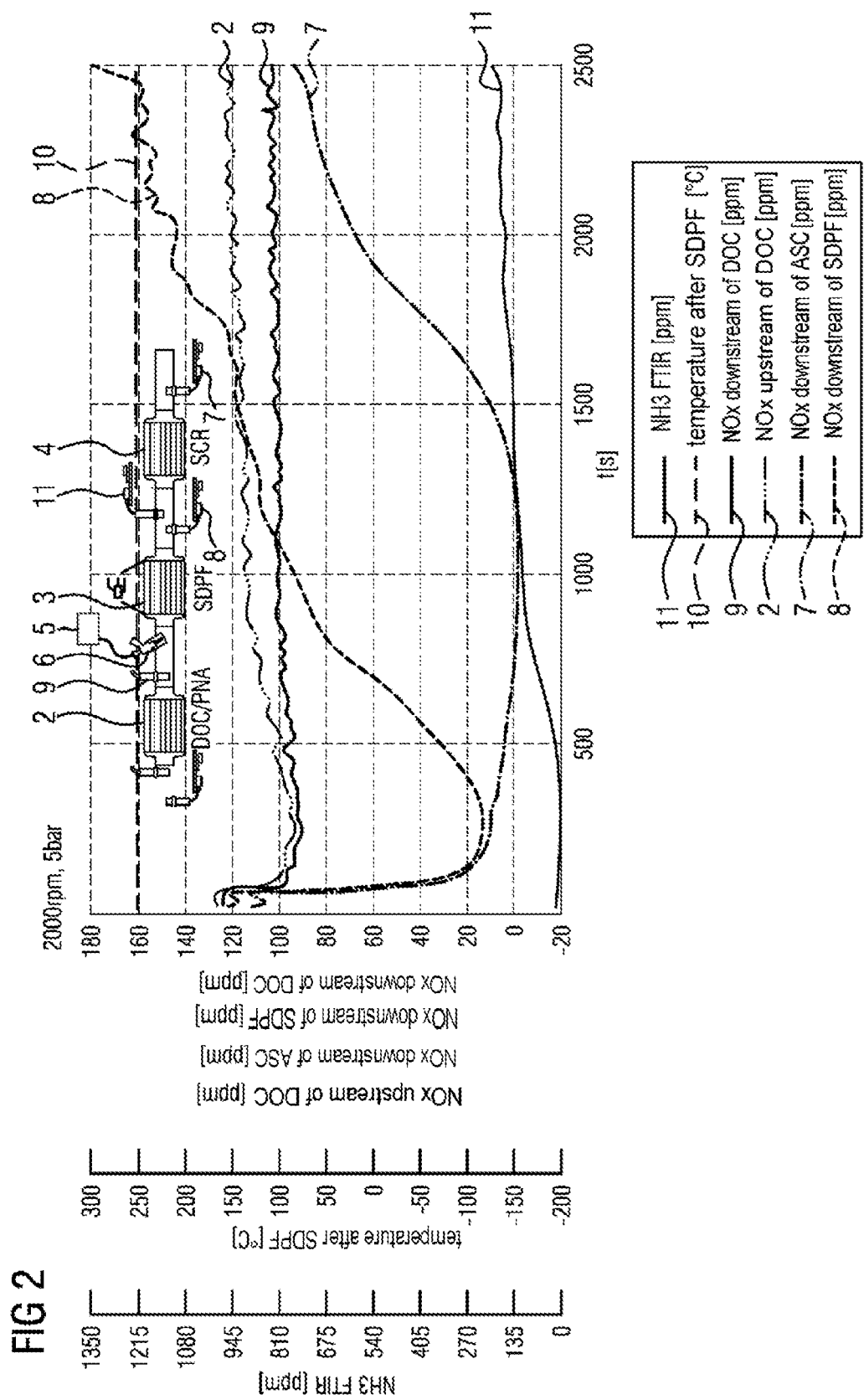
FIG. 2 is a diagram showing various NOx, $NH_3$ and temperature values at different points in the exhaust gas post-treatment system as a function of time.

FIG. 2 shows a diagram of corresponding $NH_3$, NOx and temperature values as a function of time, where the diagram indicates the origin of these values. The diagram furthermore indicates the corresponding $NH_3$ value. The respective curves carry the numbers of the corresponding measurement points.

A number of implementations have been described. Nevertheless, it will be understood that various modifications may be made without departing from the spirit and scope of the disclosure. Accordingly, other implementations are within the scope of the following claims.

What is claimed is:
1. A method for operating an exhaust gas post-treatment system of a diesel engine, the exhaust gas post-treatment system includes an SCR (selective catalytic reduction) combined diesel particle filter in the exhaust gas line, and an SCR catalyst in the exhaust gas line downstream thereof, a watery urea solution is injected into the exhaust gas line upstream of the SCR combined diesel particle filter, the method includes:
    measuring an NOx (Nitrogen Oxide) concentration downstream of the SCR catalyst by a first NOx sensor;
    measuring an NOx concentration upstream of the SCR catalyst by a second NOx sensor;

identifying the NOx concentration measured upstream of the SCR catalyst as $NH_3$ if a ratio between the NOx concentration measured downstream of the SCR catalyst and the NOx concentration measured upstream of the SCR catalyst is greater than a first threshold value, and a difference between the NOx concentration measured upstream of the SCR catalyst and the NOx concentration measured downstream of the SCR catalyst is greater than a second threshold value; and reducing the injected watery urea solution when the ratio between the NOx concentration measured downstream of the SCR catalyst and the NOx concentration measured upstream of the SCR catalyst is less than or equal to a first threshold value, and the difference between the NOx concentration measured upstream of the SCR catalyst and the NOx concentration measured downstream of the SCR catalyst is less than or equal to a second threshold value.

2. The method as claimed in claim 1, wherein when the ratio between the NOx concentration measured downstream of the SCR catalyst and the NOx concentration measured upstream of the SCR catalyst is less than or equal to the first threshold value, and the difference between the NOx concentration measured upstream of the SCR catalyst and the NOx concentration measured downstream of the SCR catalyst is less than or equal to the second threshold value, the $NH_3$ concentration upstream of the SCR catalyst is determined based on the NOx concentration measured by the first NOx sensor downstream of the SCR catalyst being equal to the NOx concentration measured by the second NOx sensor upstream of the SCR catalyst.

3. The method as claimed in claim 1, further comprising:
comparing the NOx and $NH_3$ concentrations determined by the NOx concentration measurement upstream and downstream of the SCR catalyst with the NOx and $NH_3$ model values upstream and downstream of the SCR catalyst calculated by an SCRF and SCR load model, and adapting these model values if the deviation is greater than a threshold value, in order to adapt the model values to the values obtained from the NOx concentration measurement.

4. The method as claimed in claim 1, further comprising performing an SCRF/SCR efficiency diagnosis if the actual SCRF and SCR load lies close to the nominal load.

5. The method as claimed in claim 4, wherein an OBD (on-board diagnosis) diagnosis threshold value is set depending on the load.

6. The method as claimed in claim 1, wherein a third NOx sensor is arranged upstream of the SCR combined diesel particle filter.

7. An exhaust gas post-treatment system of a diesel engine, the exhaust gas post-treatment system comprising:
an SCR combined diesel particle filter in an exhaust gas line; and
an SCR catalyst in the exhaust gas line downstream thereof;
a first NOx sensor in the exhaust gas line upstream of the SCR catalyst, the first NOx sensor measuring an NOx (Nitrogen Oxide) concentration downstream of the SCR catalyst; and
a second NOx sensor in the exhaust gas line downstream of the SCR catalyst, the second NOx sensor measuring an NOx concentration upstream of the SCR catalyst,
wherein a watery urea solution is injected into the exhaust gas line upstream of the SCR combined diesel particle filter,
wherein the NOx concentration measured upstream of the SCR catalyst is identified as $NH_3$ if a ratio between the NOx concentration measured downstream of the SCR catalyst and the NOx concentration measured upstream of the SCR catalyst is greater than a first threshold value, a difference between the NOx concentration measured upstream of the SCR catalyst and the NOx concentration measured downstream of the SCR catalyst is greater than a second threshold value; and
wherein the injected watery urea solution is reduced when the ratio between the NOx concentration measured downstream of the SCR catalyst and the NOx concentration measured upstream of the SCR catalyst is less than or equal to a first threshold value, and the difference between the NOx concentration measured upstream of the SCR catalyst and the NOx concentration measured downstream of the SCR catalyst is less than or equal to a second threshold value.

8. The exhaust gas post-treatment system as claimed in claim 7, further comprising a device for supplying a watery urea solution into the exhaust gas line only upstream of the SCR combined diesel particle filter.

9. The exhaust gas post-treatment system as claimed in claim 7, further comprising a third NOx sensor in the exhaust gas line upstream of the SCR combined diesel particle filter.

10. The exhaust gas post-treatment system as claimed in any of claim 7, further comprising a diesel oxidation catalyst arranged in the exhaust gas line upstream of the SCR combined diesel particle filter.

* * * * *